Dec. 25, 1923.
N. W. CUMMINS
LUBRICANT COMPRESSOR
Filed Feb. 2, 1921
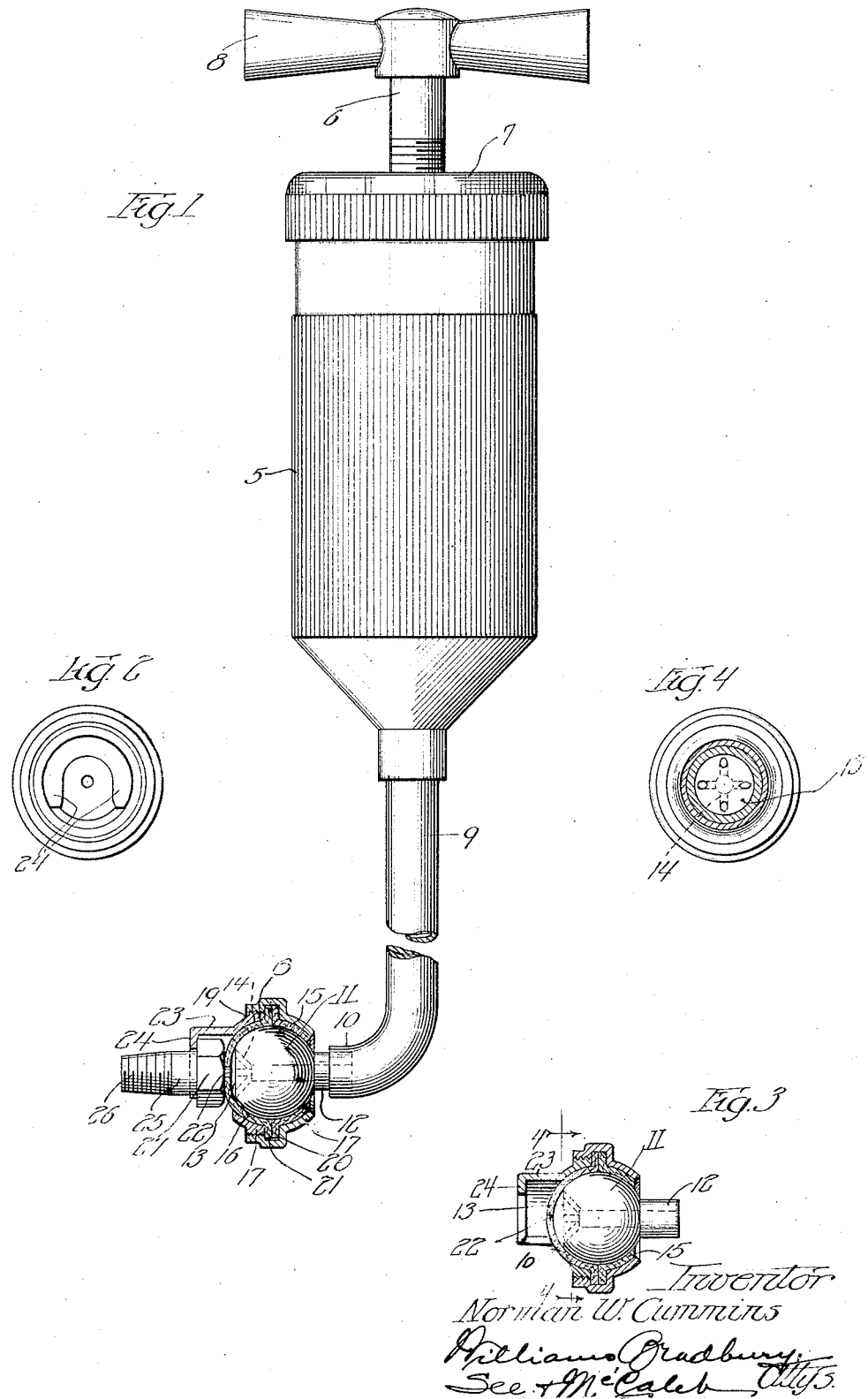
Inventor
Norman W. Cummins Patented Dec. 25, 1923.

1,478,848

UNITED STATES PATENT OFFICE.

NORMAN W. CUMMINS, OF BRIDGEPORT, CONNECTICUT, ASSIGNOR TO THE BASSICK MANUFACTURING COMPANY, OF CHICAGO, ILLINOIS, A CORPORATION OF DELAWARE.

LUBRICANT COMPRESSOR.

Application filed February 2, 1921. Serial No. 441,745.

*To all whom it may concern:*

Be it known that I, NORMAN W. CUMMINS, a citizen of the United States, and resident of Bridgeport, in the county of Fairfield and State of Connecticut, have invented a certain new and useful Improvement in Lubricant Compressors, of which the following is a full, clear, concise, and exact description, reference being had to the accompanying drawings, forming a part of this specification.

My invention relates to improvements in lubricant compressors, and is particularly concerned with that type of lubricant compressor which comprises a suitable receptacle for lubricant, having a discharge conduit, the free end of which is provided with a coupling means adapted to be successively attached to and detached from a plurality of lubricant receiving members, secured to the various bearings to be lubricated. The lubricant receptacle is provided with means whereby the lubricant can be discharged therefrom, through the discharge conduit, under very considerable pressure.

The objects of my invention are:

1st. To provide a compressor of the character described comprising a receptacle for holding lubricant, said receptacle having a discharge conduit the free end of which is provided with a coupling member constructed in such a manner that it is possible to make connection with a lubricant receiving device irrespective of the angle at which it is placed.

2d. To provide a compressor of the character described wherein the discharge conduit is formed of metal tubing or other rigid material.

3d. To provide a compressor such as described above wherein the discharge conduit is rigidly connected with the lubricant receptacle.

4th. To provide a lubricant compressor comprising a receptacle for holding lubricant and a rigid discharge conduit rigidly connected therewith with means for attaching it to and detaching it from a lubricant receiving device of such construction that any movement of the discharge conduit during the filling operation will not impose injurious stress upon the lubricant receiving device or portions of the compressor.

Other objects will appear as this description progresses, reference being had to the accompanying drawings, in which—

Figure 1 is a side elevation of my compressor, portions thereof being broken away for purpose of better illustration, Figure 2 is an end view of the coupling means, Figure 3 is a central longitudinal section through the coupling means, this view showing the lubricant receiving device removed, and Figure 4 is a transverse section taken on line 4—4 of Figure 3 looking in the direction of the small arrows.

Referring to the drawings, my improved compressor comprises a barrel 5 having a screw-threaded piston rod 6 which engages suitable threads in the cap 7 and is provided with a handle 8 whereby it may be rotated. The inner end of the piston rod 6 is provided with a plunger not shown, by means of which the lubricant can be subjected to pressure by rotating the piston rod 6. The construction thus far described is well-known and need not be further described. The details thereof form no part of my present invention except as they co-act with the parts about to be described.

A discharge conduit 9, preferably formed of metal tubing, has one end connected with the barrel 5, and the other end 10 of the conduit is bent at an angle thereto, as shown in Figure 1, and is provided with means for establishing a detachable connection with a lubricant receiving device. This means comprises a spherical head 11 having a shank 12 formed integrally therewith, which is secured at the open end of the discharge conduit. The side of the head 11 opposite the shank 12 is flattened as shown at 13. A passageway extends through the head 11 and its shank. The inner end of this passageway communicates with the bore of the discharge conduit and the outer end thereof is divided into a plurality of outwardly diverging branch passageways 14 (see Figures 1, 3 and 4), which open through the flattened face 13.

A pair of oppositely disposed gaskets 15 and 16 respectively, which are preferably formed of rubber, leather, or other suitable flexible material, embrace the spherical head 11 and are conformed and secured thereto by the clamping ring 17 and the collar 18. The last two mentioned members are connected together by a screw-threaded joint 19. The adjacent edges of the gaskets 15 and 16 are flanged outwardly as shown at 20 and 21 and clamp between opposing portions of the ring 17 and the collar 18.

The gasket 16 has a portion extending across a flattened face 13 and in spaced relation thereto, and is provided with a discharge orifice 22 which communicates with the passageway extending through the head 11.

The collar 18 is provided with an outwardly extending cylindrical extension 23, the outer edge of which is flanged inwardly as shown at 24, to provide a bifurcated member which is adapted to surround the tubular portion of the lubricant receiving device 25.

The lubricant receiving device 25 comprises a tubular portion having screw threads 26 at one end for securing it to a bearing to be lubricated, and a head 27 at the other end, which is adapted to be inserted between the flange 24 and the gasket 16. The head 27 has an inlet orifice formed therein which is adapted to register with the discharge orifice 22 of the gasket 16, and is usually provided with a spring-pressed closure not shown. The particular construction of the lubricant receiving device forms no part of my present invention, which is capable of being used in connection with other well-known types of lubricant receiving devices forming parts of systems such as described in general terms in the introductory portion of this specification.

In using the improved compressor described above, the operator merely grasps hold of the barrel 5, and by reason of the rigid discharge conduit 9 and its rigid connection with the barrel of the compressor, he is enabled to position the coupling member at any desired point, even if this necessitates inserting the conduit into a relatively small opening or space. If the ring 17 and the collar 18 are adjusted toward each other sufficiently, the friction between the spherical head and the gaskets will be sufficient to enable the operator to manipulate the bifurcated portion of the coupling member about the tubular portion of the lubricant receiving device without touching the coupling member. Otherwise, it will be necessary for him after having properly positioned the coupling member to use one hand to properly position it with respect to the lubricant receiving device. When this has been done, the compressor and the lubricant receiving device will occupy the relative positions shown in Figure 1, which shows the outer portion of the gasket 16 deflected slightly inwardly toward the flattened face 13, so that an initial seal is established between the gasket and the head of the lubricant receiving device. The operator thereupon rotates the handle 8 in the proper direction to subject the lubricant in a barrel to pressure. Lubricant will thereupon flow through the discharge conduit 9 and the passageway extending through the head 11 out through the branch passages 14 and into the space between the flattened face 13 and the gasket 16. The pressure of the lubricant thus exerted upon the inner side of the gasket 16 will press it outwardly into tight contact with the adjacent face of the lubricant receiving device, and establish a thorough seal. The lubricant will then pass through the discharge orifice 22 into the lubricant receiving device. When it is desired to disconnect the compressor from the latter device the handle is rotated to relieve the pressure on the lubricant in the barrel 5 and the coupling member can then be easily disconnected from the lubricant receiving device.

While I have described the detail of the perfected embodiment of my invention, it is to be clearly understood that my invention is not limited to these details, but is capable of other adaptations and modifications within the scope of the appended claims.

Having thus described my invention, what I claim is:

1. A lubricant compressor comprising a receptacle for holding lubricant, a rigid discharge conduit rigidly connected therewith, the free end of said conduit being turned at an angle thereto and ending in a spherical head having a flattened face, said head being provided with a passageway communicating with said conduit and opening through said flattened face, a coupling member universally mounted on said head and rotatable relatively thereto, and an apertured gasket extending across said flattened face in spaced relation thereto.

2. A lubricant compressor comprising a receptacle for holding lubricant, a rigid discharge conduit rigidly connected therewith, the free end of said conduit ending in a spherical head having a flattened face, said head being provided with a passageway communicating with said conduit and opening through said flattened face, a coupling member universally mounted on said head, and an apertured gasket extending across said flattened face in spaced relation thereto.

3. A lubricant compressor comprising a receptacle for holding lubricant, a rigid discharge conduit rigidly connected therewith, the free end of said conduit ending in a spherical head having a flattened face, said head being provided with a passageway communicating with said conduit and opening through said flattened face, a coupling member rotatable relatively thereto, and an apertured gasket extending across said flattened face in spaced relation thereto.

4. A lubricant compressor comprising a receptacle for holding lubricant, a rigid discharge conduit rigidly connected therewith, the free end of said conduit ending in a spherical head having a flattened face, said head being provided with a passageway communicating with said conduit and opening through said flattened face, a coupling member rotatable relative thereto, and an apertured gasket extending across said flattened face.

5. A lubricant compressor comprising a receptacle for holding lubricant, a rigid discharge conduit rigidly connected therewith, the free end of said conduit being bent at an angle thereto and ending in a member having a lubricant discharge opening, a flexible gasket extending over a portion of said member in spaced relation, and means for making a detachable connection with a lubricant receiving device, the said connecting means being universally flexibly mounted and comprising means for holding said gasket against one face of said lubricant receiving device.

6. A lubricant compressor comprising a receptacle for holding lubricant, a rigid discharge conduit rigidly connected therewith, the free end of said conduit being bent at an angle thereto and ending in a member having a lubricant discharge opening, a flexible gasket extending over a portion of said member in spaced relation, and means for making a detachable connection with a lubricant receiving device, the said connecting means comprising means for holding said gasket against one face of said lubricant receiving device and being mounted to move in a plurality of directions relatively to said member.

In witness whereof I hereunto subscribe my name this 27th day of January, 1921.

NORMAN W. CUMMINS.

Witnesses:
EDNA V. GUSTAFSON,
E. J. BOURGEOIS.